INVENTOR.
JACK PRESTON

INVENTOR.
JACK PRESTON

United States Patent Office 3,632,548
Patented Jan. 4, 1972

3,632,548
AROMATIC POLYAMIDE-HYDRAZIDES
Jack Preston, Raleigh, N.C., assignor to Monsanto
Company, St. Louis, Mo.
Filed May 2, 1968, Ser. No. 726,648
Int. Cl. C08g 20/20
U.S. Cl. 260—32.6 N      5 Claims

ABSTRACT OF THE DISCLOSURE

Aromatic polyamide-hydrazides containing carbonamide and hydrazide linkages separated by aromatic nuclei are described with methods of preparation. These polymers are useful in the preparation of fibers, filaments, films and other products for textile and general industrial end uses.

BACKGROUND OF THE INVENTION

Synthetic linear condensation polymers such as polyamides in the form of fibers, filaments, films and other shaped articles have found wide application in textile and other industrial end uses requiring such properties as high modulus, dimensional stability, high tensile strength, abrasion resistance, and resistance to thermal and other degradative conditions. In recent years, a need has arisen for polymers having even better temperature resistance, improved physical properties and resistance to other types of degradation. Subsequent searching for such polymers has produced various heterocyclic polymers such as polyoxadiazoles from polyhydrazide precursors, polybenzimidazoles, polyimides, amide-heterocycle polymers and copolymers of two or more heterocycles. Typical of such polymers are those in U.S. Pats. 3,044,994 and 3,130,182; 2,895,948 and 3,174,947; 2,904,537 and 3,376,257; 3,179,634; 3,324,086; and 3,376,268.

Wholly aromatic polyamides such as those formed by the condensation of aminobenzoyl chlorides or by the condensation of aromatic diamines or aromatic diamines containing internal carbonamide linkages with aromatic diacid chlorides have also been found to be resistant to high temperatures and to have excellent physical properties. Such polymers include those in British Patent 901,159; Belgium Pat. 569,760 and U.S. Pats. 3,006,899; 3,063,966; and 3,232,910.

All of these polymers have only partially fulfilled the growing need for temperature resistant fibers of high modulus and good dimensional stability and the polymers of this invention represent a substantial advance towards the achievement of this goal.

SUMMARY OF THE INVENTION

This invention pertains to (1) a novel class of high molecular weight, wholly aromatic, linear condensation polymers having a wide range of chemical order and which contain carbonamide and hydrazide linkages, each linkage being separated by an aromatic nucleus and (2) control of the degree of order of these polymers.

These polymers may be prepared from relatively inexpensive, commercially available monomers by simple one or two step reactions that are easy to carry out and allow one to vary the polymer structure and degree of chemical order in a controlled manner. They have greatly improved properties relative to other wholly aromatic polymers.

DETAILED DESCRIPTION AND PREFERRED EMBODIMENTS

Figure 1:
In FIGS. 1 through 6 electron diffraction patterns show decreasing degrees of order of the polymers of the invention.

This invention is concerned with the provision and preparation of wholly aromatic amide-hydrazide polymers which have a predominance of alternating units of the formulas

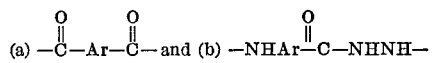

along the chain wherein Ar is an aromatic residue and the Ar in the (a)-type formula and the (b)-type formula may be the same or different. For example, the Ar may be a single, multiple or fused ring system, and the Ar in the (a)-type formula and the Ar in the (b)-type formula may have the same or a different orientation. Further, a given polymer may consist of at least two different (a)-type moieties and at least two (b)-type moieties.

The divalent aromatic radicals may be, for example, one or more of the following:

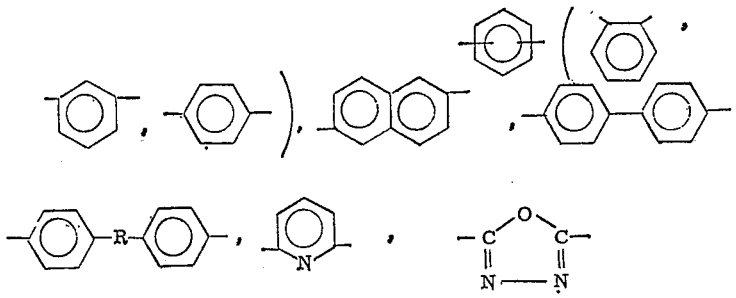

wherein R represents a linkage such as for example

—O—, —N=N—, —HC=CH—, —SO₂—, —CH₂—,

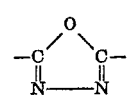

and the like.

Further, up to about 10% of other polymer-forming reactants which may or may not contain an aromatic nucleus can be included without seriously detracting from the outstanding physical and chemical properties of the polymers of this invention.

In general the preparation of the polymers of this invention may be accomplished by either a one step or a two step reaction. In the case of one-step reaction, amino-aroylhydrazide monomer AB is reacted with a suitable reactive dicarbonyl aryl donor monomer such as an aromatic diacid halide or aromatic diacid ester monomer CC to give amide-hydrazide polymers containing [ABCCBACC] and [ABCC] blocks of varying sequence lengths. The sequence lengths or degree of order of these polymers may be controlled by the proper manipulation of the polymerization reaction. In this one-step process described above preferential chemical order along the polymer chain can result as a consequence of the difference in the reactivities of the aromatic amine and hydrazide end groups of the aminoaroylhydrazide monomer. The degree of chemical order along the chain depends on the particular reaction conditions employed.

In the case of the two step preparation of the polymers of the invention the first step involves the preparation of an amine terminated aromatic dihydrazide monomer by the reaction of the above AB type monomer with CC to give a monomer having the structure ABCCBA. In the second step, ordered polymers, represented by the structure ABCCBADD, may be prepared by the reaction of this ABCCBA type monomer with a suitable reactive monomer DD. The DD monomer may be the same as, or different from the CC monomer.

The polymers of this invention, depending on the method of preparation may comprise one or both of the structural segments of the formulas

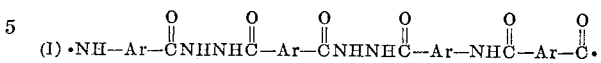//

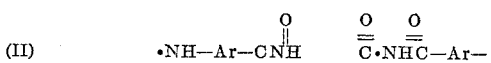

wherein Ar has the significance previously given. The dots signify that polymer chain segments are represented rather than polymer repeat units.

Polymers having segments of I only may be prepared as described above by the two-step process. Polymers having segments of II only may be prepared from monomers such as

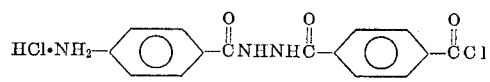

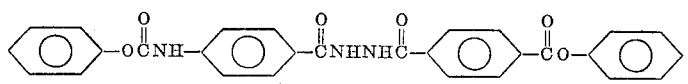

Polymers consisting of segments of I and II in combination may be prepared as described above by the one-step process.

Some typical general classes of the ordered polymers of this invention which may be prepared by the two-step method are illustrated by the following formulas (1)
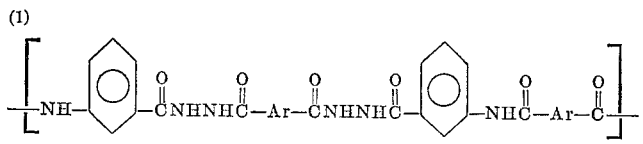

(2)
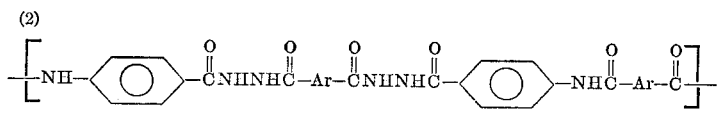

(3)
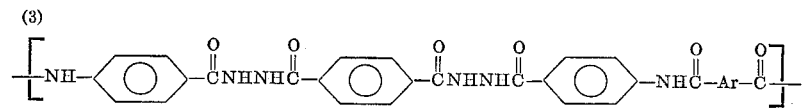

(4)
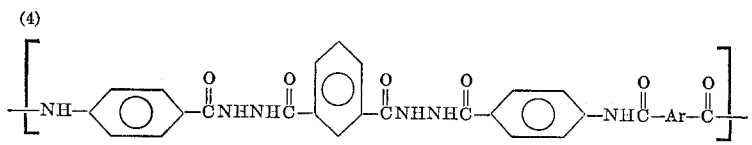

(5)
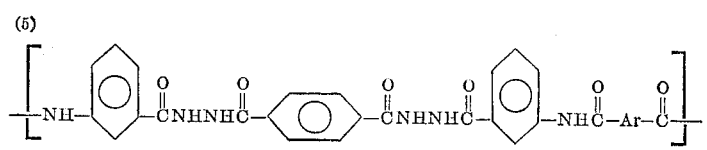

wherein Ar has the significance previously given.

Illustrative examples of the ordered polymers of the invention which may be prepared by the two-step method are:

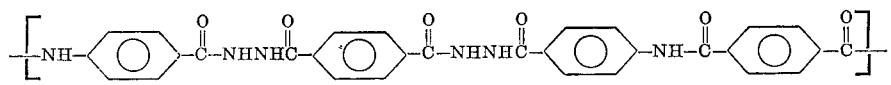
(6)

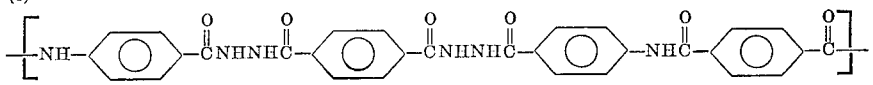
(7)

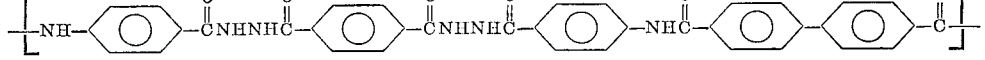
(8)

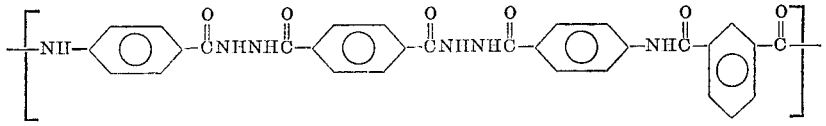
(9)

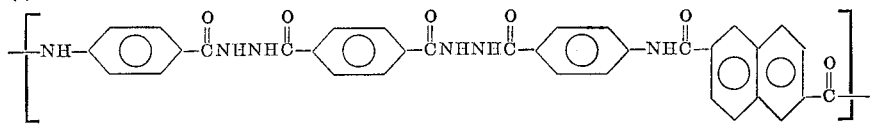

Polymers of this invention which may be made by the one-step process may also be illustrated by the following general formula

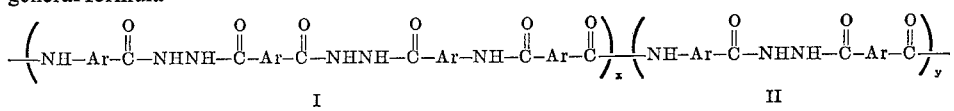

wherein $x$ and $y$ are average numbers representing the average sequence lengths of segments I and II respectively in the polymer chain, and wherein the total number of segments, i.e., I segments plus II segments, is sufficient for high molecular weight. Below is a representation of an entire polymer molecule which exemplifies the general formula above:

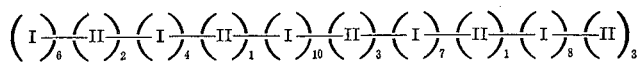

For this example, the $x$ of the general formula above would be the sum of the individual sequence lengths divided by the number of sequences of I-type segments, i.e. $6+4+10+7+8$ divided by 5 or $x=7$; similarly for this molecule $y$ is equal to 2. Where either $x$ or $y$ approaches 0 in the general formula above, the polymer is essentially completely ordered with respect to the sequential occurrence of amide and hydrazide linkages along the polymer chain, and the closer either $x$ or $y$ approaches 0, the more ordered is the polymer. Also, the greater the difference in $x$ and $y$ the higher the degree of order. For example, where $y$ approaches 0, the general formula above approaches that of the general formula for those polymers that may be prepared by the two-step process described above, i.e., the general formula approaches

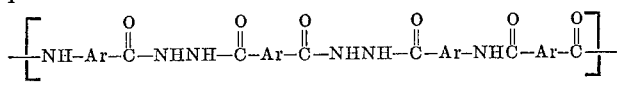

Order of the polymer is affected further by the symmetry of segments I and II in the general formula above; thus increased symmetry of segments I and II increases the symmetry of the polymer over and above that which results alone from having the amide and hydrazide linkages occur in regular sequence. For example, where $y$ approaches 0 and the Ar's are all para-phenylene, the polymer is an essentially completely ordered polymer of the type shown in the formula below When the two-step method is used, the first step involves the preparation of an amine terminted aromatic dihydrazide monomer, having the general formula shown below:

(III)     

wherein Ar has the chemical structure previously designated and may be the same or different. The Ar's in structure (III) can be selected so that the resulting dihydrazide-diamine will be symmetrical. Selected examples of such monomers are found in Table I.

The dihydrazide-diamine may be prepared by several syntheses; for example, the reaction of nitroaroylhydrazides with an aromatic diacid halide, followed by reduction of the dinitro compounds thus obtained may be used to prepare the corresponding dihydrazidediamine. The nitroaroylhydrazides used for the preparation of these dihydrazide-diamines may be prepared by the reaction of hydrazine with an ester of an aromatic nitro acid.

The second step of the process consists of the reaction of a dihydrazide-diamine monomer (III above) with an aromatic diacid halide to produce a polymer ordered with respect to the sequential occurrence of the amide and hydrazide linkages as illustrated by Formula IV below. When the dihydrazide-diamine and the diacid chloride are both symmetrical a completely ordered polymer results.

(IV)

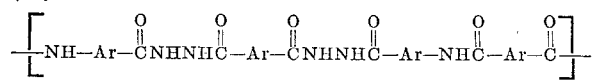

wherein Ar has the same structural characteristics as previously designated.

Alternatively, the polymers of this invention may also be prepared by one-step methods. These methods typically involve the reaction of an aromatic diacid halide with the aminoaroylhydrazide. The one-step method is illustrated by the reaction of p-aminobenzhydrazide with terephthaloyl chloride, as follows:

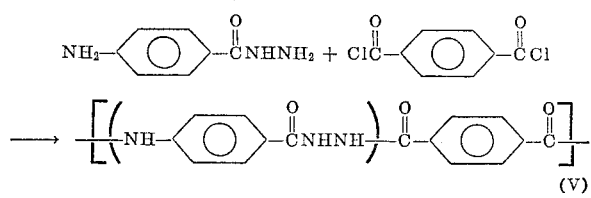

Because monomers such as p-aminobenzhydrazide are capable of entering the polymer chain in either a head-to-head or head-to-tail fashion, no simple repeating unit for Formula V can be assumed. Therefore, when referring to polymers of this invention, prepared by the one-step method, the convention has been adopted of placing the aminohydrazide residue in parentheses within the generalized polymer repeat unit V. This signifies that the amino-hydrazide moiety can appear as shown or in the reverse manner within the parentheses.

The difference in reactivity of the amine and hydrazide end groups of the aminoaroylhydrazide tends to cause the aminoaroylhydrazide moiety to appear in the polymer chain in a head-to-head direction such that the polymer tends to approach the repeat unit VI in structure

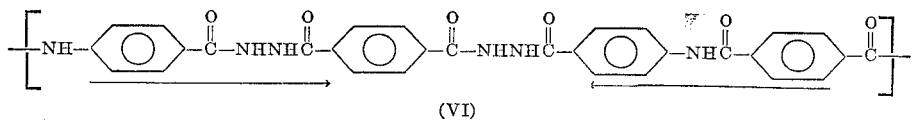

The degree to which the aminoaroylhydrazide enters in the fashion shown is influenced by various reaction conditions.

Thus the one-step method can be used to prepare polymers of this invention having from nearly complete order to those having substantial disorder. Among the factors affecting the order of polymers prepared by the one-step method are reaction temperature; the hydrogen chloride produced in the polymerization and whether it is scavenged or not; diffusion of reactants in the reaction medium; the solvent employed; rate of stirring; rate of addition of one reactant to the other; the manner in which one reactant is added to the other; etc. Some of the possible effects of such factors on the degree of order in the resultant polymer are exemplified in the examples.

Figure 2:
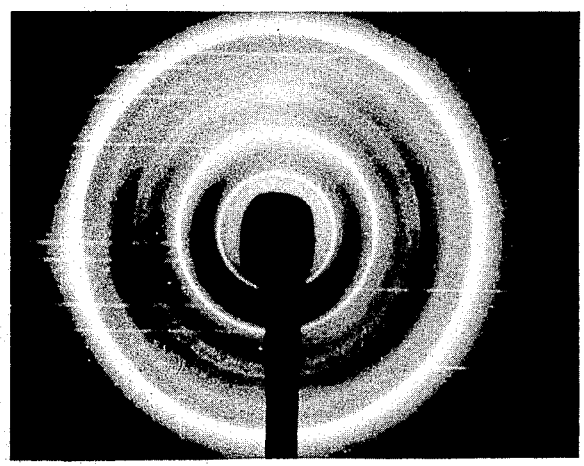
Figure 3:
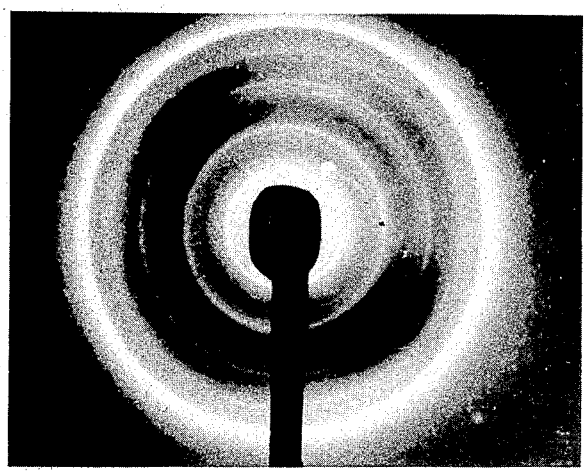
Figure 4:
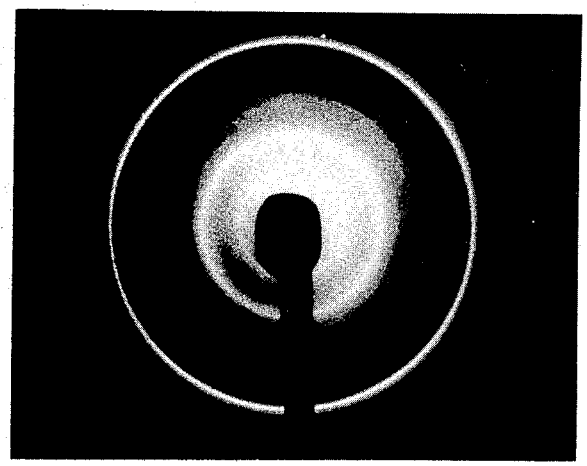
Figure 5:

Films cast from polymers obtained by various polymerization techniques were analyzed by electron diffraction for crystallographic order. This technique which measures physical order can also indicate the degree of chemical order of these polymers. FIGS. 1 through 6 are electron diffraction patterns of six polymers each made from the same aminoaroylhydrazide and the same aromatic diacid chloride, paraaminobenzhydrazide and terephthaloyl chloride respectively, such that the overall chemical composition is the same in each case but of different chemical order in the sense of head-to-head versus head-to-tail alignment of the aminoaroylhydrazide moiety as described hereinbefore. Thus, the differences in the electron diffraction patterns. The figures are arranged to show decreasing degrees of order from 1 through 6. FIG. 1 is an electron diffraction pattern obtained on a completely ordered polymer made by the two-step method. FIGS. 2 through 6 are diffraction patterns for one-step polymers each of which was polymerized utilizing a different set of reaction conditions. The highest degree of order is shown by the completely ordered polymer (FIG. 1). It is seen in FIGS. 2 and 3 that the order of these one-step prepared polymers closely approaches that of the completely ordered polymer. The electron diffraction of the polymer shown in FIG. 6, however, shows that the polymer has substantial disorder. FIGS. 4 and 5 show that these polymers have intermediate order.

When the two-step method is used to prepare the polymer of this invention, completely ordered polymers, such as illustrated by Formula IV are the only possible type of structures which can be obtained as regards the sequence of amide and hydrazide linkages. However, the structural composition of polymers prepared by the two-step method can be desired by a choice of the aminoaroylhydrazide and aromatic diacid halide monomers used for the preparation of the dihydrazide-diamine monomer of the first step, as well as the aromatic diacid halide monomer used in the second step or polymerization reaction.

The methods described previously for the preparation of the polymers of this invention may be carried out using solution or interfacial techniques. Solution polymerization is generally preferred in the case of both the one-step and the two-step methods, since the polymers thus formed can be spun directly into fibers without isolation.

The solution technique generally involves dissolving the dihydrazide-diamine monomer or the aminoaroylhydrazide in a suitable solvent for the polymerization reaction. Among such solvents there may be mentioned dimethylacetamide, N-methyl-2-pyrrolidone, 1,5-dimethyl-2-pyrrolidone, hexamethylphosphoramide, and the like, or mixtures thereof. These solvents are rendered more effective in many instances by mixing them with small quantities, up to 10 percent, of an alkali or alkaline earth metal salt such as lithium chloride, lithium bromide, magnesium bromide, calcium chloride and the like. One of the preferred solvents for the polymerization reaction is dimethylacetamide, especially dimethylacetamide containing a small amount of dissolved lithium chloride.

In the preparation of polymers, by the two-step method using the solution technique, a solution of the dihydrazide-diamine is cooled to a temperature of between about −30° C. and 100° C., preferably to between about 35 and −30° C., and the aromatic diacid halide added, either as a solid, liquid or in a suitable solvent. The mixture is stirred until polymerization is substantially complete and the desired viscosity is obtained.

In the preparation of polymers by the one-step method using the solution technique, any one of several procedures may be used and polymers are obtained having differing degrees of order, depending on the particular reaction conditions employed. Particularly important with respect to chemical order is the degree to which the reaction is diffusion controlled. The effect of diffusion of the reactants is probably more important in the type of solution polymerization where the diacid chloride is added as a solid to a solution of the aminoaroyl hydrazide.

In another method for carrying out the polymerization, the aromatic diacid halide may be dissolved in a solvent such as tetrahydrofuran, chloroform and the like and added to the aminoaroylhydrazide solution. Amide-type solvents, such as dimethylacetamide can also be used, but when such solvents are used it is preferable to dissolve the diacid halide in the solvent just prior to the time of addition.

In yet another mode of preparation, a salt such as lithium chloride may be added to the aminoaroylhydrazide solution prior to the addition of the aromatic diacyl halide. It has been found that a solution of dimethylacetamide containing dissolved lithium chloride is a better or more efficient acid acceptor than dimethylacetamide alone.

In still another method of preparation of the polymers of this invention, the aromatic diacid halide and aminoaroylhydrazide may be added simultaneously, either in solution or as solids to a rapidly stirred solvent.

The polyamide-hydrazides of this invention may also be prepared by the addition of an aminoaroylhydrazide to a solution of the diacid halide.

The degree of order of the polymer obtained in the one-step process may be influenced by the addition of an acid acceptor which is stronger than that of the polymer solvent alone. Acid acceptors of this type typically are tertiary amines such as triethylamine, diethylcyclohexylamine and the like.

It has been found that polymers with relatively lower degree of order tend to be more soluble than those with relatively higher degree of order, and accordingly, are more readily fabricated to useful articles. On the other hand, polymers with a relatively high degree of order tend to be more thermally stable.

The viscous polymer solutions, prepared as described above, may be spun as such or the polymers may be isolated, for example by pouring the mixture into a non-solvent, washing and drying the polymer and then perparing the spinning solution. Prior to the spinning of the polymer solutions, made by the one-step or two-step methods, it is desirable to reduce the corrosive effects of hydrogen chloride on the spinning equipment, by neutralization or other means. For example, the hydrogen chloride may be reacted with such materials as lithium hydroxide, lithium carbonate, calcium carbonate, calcium acetate and the like. The fibers of this invention exhibit outstanding modulus and dimensional stability properties.

The interfacial technique may also be used for the preparation of the polymers of this invention by the polymerization of aminoaroylhydrazide and dihydrazide-diamine monomers with diacid halides. The interfacial reaction, for example, may be conducted by mixing water, an emulsifier, and the dihydrazide-diamine monomer or the aminoaroylhydrazide, which may be in the form of their hydrochlorides. A proton acceptor is then added and the mixture stirred rapidly, while adding the dicarbonyl compound as a solid, liquid or in solution in a suitable solvent. The mixture is stirred until the reaction is essentially complete, and the polymer may then be isolated by filtration, washed and dried. Typically, the solvent for the dicarbonyl compound may be tetrahydrofuran, chloroform and the like.

Suitable emulsifying agents for the interfacial polymerization reaction include anionic and non-ionic compounds such as sodium lauryl sulfate, nonyl phenoxy (ethylene oxy) ethane, the sodium or potassium salt of any suitable condensed sulfonic acid and the like.

Polymers prepared by the interfacial technique and those precipitated from the solutions resulting when the solution technique is used may be washed free of impurities before making solutions for fabrication. A major advantage of isolating the polymers lies in the fact that these polymers may be dissolved in dimethyl sulfoxide without the addition of salts. This provides a convenient means for fabricating salt free articles. Salt free products are generally desired for electrical insulation applications.

The amounts of the various reactants which may be employed in the preparation of the polymers of this invention will, of course, vary according to the type of polymer desired. In most instances, however, substantially equimolecular quantities are used.

In some cases, when using the solution method for the preparation of the polymers of this invention, a sufficient amount of proton acceptor to neutralize the acidic by-products formed may be added, the exact amount being easily determined by experiment. When the interfacial method is employed, a sufficient amount of proton acceptor is essential for best results. A proton acceptor, as the term is used herein, indicates a compound which acts as an acid scavenger to neutralize the hydrogen chloride, formed during the reaction, and which aids in carrying the reaction to completion. Suitable proton acceptors include sodium carbonate, calcium acetate, calcium carbonate, lithium hydroxide, triethyl amine and the like.

The polymers of this invention may be fabricated into fibers, filaments, ribbon, films and the like. They may also be converted into resins, coatings, varnishes and other shaped articles. These polymers may also be used as precursors to other useful polymers, especially, thermally stable polymers such as polyoxadiazole-amides, polytriazole-amides and chelated polymers.

The invention is further illustrated by the following examples in which all parts and percents are by weight unless otherwise indicated.

EXAMPLE I

The following example illustrates the preparation of the aminoaroylhydrazide and dihydrazide-diamine monomers used in the practice of this invention.

(A) Aminoaroylhydrazides

The preparation of p-aminobenzhydrazide is given below. In a similar manner the o- and m-aminobenzhydrazides were prepared; the melting points of these monomers were found to be 120–121 and 96–97° C., respectively.

A mixture of 5 g. p-aminobenzoate, 17 g. of hydrazine (96%), 15 ml. of ethanol and 35 ml. of water was refluxed for 4 hours. Upon cooling, 4 g., of p-aminobenzhydrazide, M.P. 223–225° C., separated. After recrystallization, the product had an M.P. 230–232° C.

(B) Dihydrazide-diamines

The preparation of one symmetrical dihydrazide-diamine is given. Other isomers, with their melting points are given in Table I.

To a solution of 18.1 g. (0.1 mole) p-nitrobenzhydrazide in 200 ml. dimethylacetamide at 0° C. was added 10.15 g. (0.05 mole) of isophthaloyl chloride. The reaction mixture was allowed to warm to room temperature (RT) and then stirred for two hours at RT. The product was precipitated into water, whereupon a 21 g. yield of product, having a M.P. of 317–320° C. was obtained. Recrystallization of the crude dinitro compound from 110 ml. of dimethylformamide (DMF) afforded 20 g. of pure product; M.P. 319–320° C.

The dinitro intermediate was reduced in 200 ml. of dimethylacetamide (DMAc) using 2 g. of Raney nickel catalyst and hydrogen under pressure (290 p.s.i.). The mixture was heated to 100° C. at which time the pressure reached 345 p.s.i., and then fell off as the reduction proceeded. After cooling the bomb, the filtrate was collected and the product precipitated into two liters of water. A 16 g. yield of pure B, was obtained; M.P. 305–306° C.

The electron diffraction pattern of a film of this polymer (FIG. 1) shows it has the highest degree of order

TABLE I

| Dihyrazide-diamines [a] | M.P., °C.[b] |
|---|---|
| A. $NH_2-\phi-C(O)-NH-NH-C(O)-\phi-C(O)-NH-NH-C(O)-\phi-NH_2$ | 350–352 (358–360) |
| B. $NH_2-\phi-C(O)-NH-NH-C(O)-\phi-C(O)-NH-NH-C(O)-\phi-NH_2$ | 305–306 (327–329) |
| C. $NH_2-\phi-C(O)-NH-NH-C(O)-\phi-C(O)-NH-NH-C(O)-\phi-NH_2$ | 300–302 (344–346) |
| D. $NH_2-\phi-C(O)-NH-NH-C(O)-\phi-C(O)-NH-NH-C(O)-\phi-NH_2$ | 153–155 (280–281) |

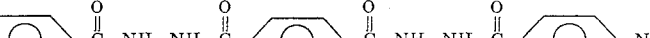
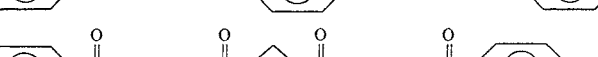
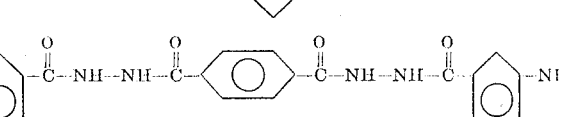
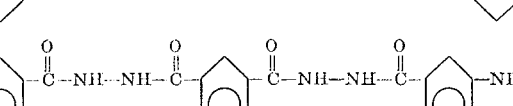

[a] The melting points of the dinitro compounds corresponding to the various dihydrazide-diamines are given in parentheses.
[b] Uncorrected.

EXAMPLE II

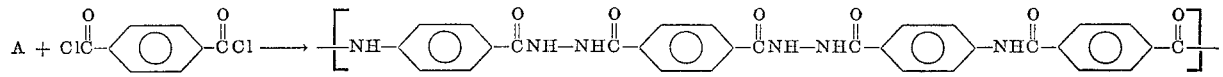

$A + ClC(O)-\phi-CCl \longrightarrow [-NH-\phi-CNH-NHC(O)-\phi-CNH-NHC(O)-\phi-NHC(O)-\phi-C(O)-]$ This example illustrates the preparation of the completely ordered polymer shown above from a symmetrical dihydrazide-diamine of Table I and a diacid chloride. Polymerization of any other dihydrazide of Table I with symmetrical diacid chlorides also produces completely ordered polyamide-hydrazides.

A solution of 4.32 g. (0.01 mole) A (Table I) in 70 ml. of DMAc containing 5% dissolved lithium chloride was cooled to −10° C. and 2.03 g. (0.01 mole) of solid terephthaloyl chloride was added with stirring. After 10 minutes the clear, viscous solution was allowed to warm to 0° C. and an additional 10 ml. solvent added. After another 10 minutes at 0° C. the solution was allowed to warm to room temperature and 20 ml. more of solvent was added.

Prior to spinning the polymer solution or "dope," it was neutralized by the addition of 0.67 g. of lithium carbonate. The dope was stirred for 1 hour followed by heating to 50° C. for 30 minutes with continued stirring, then followed by heating at 80° C. for 20 minutes again with continued stirring. The clear, light yellow and very viscous solution of polymer (containing approximately 5 percent polymer solids) was spun to fiber. The inherent viscosity of the dried bulk polymer was 5.1 (determined at 30° C. on a solution of 0.5 g. of polymer in dimethyl sulfoxide).

The properties of the fiber, where $T/E/M_i(den.) = T$, tenacity in grams per denier (g.p.d.); E, percent elongation; $M_i$, initial modulus, g.p.d.; (den.), denier per filament, are:

(1) low spinning orientation—$T/E/M_i(den.) = 5.2/33.4/81(4.6)$
(2) high spinning orientation—$T/E/M_i(den.) = 8.2/9.4/291(3.7)$
(3) hot drawn—$T/E(den.) = 10.8/2.9(den. 2.7)$ The retention of tensile properties at elevated temperatures was found to be excellent.

| Temp., °C. | T/E/M without hot-draw | |
|---|---|---|
| 100 | 5.9/16.7/222 | 8.3/2.8/— |
| 200 | 3.9/26.2/142 | 4.7/2.3/263 |
| 300 | 1.9/3.3/154 | 3.1/1.6/223 |
| 350 | 1.4/1.5/125 | 1.4/1.1/169 | as one would expect since it is the most ordered polymer that can be made from p-aminobenzhydrazide and terephthaloyl chloride.

EXAMPLE III

This example illustrates the preparation of polymer from the condensation of an unsymmetrical monomer, p-aminobenzhydrazide (PABH), with a symmetrical one, terephthaloyl chloride (TCl), to give a series of polymers having the same empirical composition, but different degrees of order ranging from that of a relatively disordered, polyamide-hydrazide to that of an essentially, completely ordered polyamide-hydrazide consisting of regularly recurring structural units.

The choice of this all para-phenylene type polymer for the illustration of the degrees of order obtainable by variations made in the polymerization conditions facilitates this determination because the all para-oriented polymers tend to be crystalline, making the estimation of order possible by electron diffraction. Reference to the electron diffraction patterns, FIGS. 1–6, will be made for examples of certain of these polymers.

(A) Solid TCl, DMAc solution

A solution of 0.302 g. (0.002 mole) PABH in 3 ml. of DMAc was cooled to 0° C. and 0.406 g. (0.002 mole) solid TCl was added. Polymer made by this and similar processes (FIG. 6) was found to have low order, indicative of a relatively large amount of structural disorder, i.e., both head-to-head and head-to-tail alignments along the polymer chain. FIG. 5 shows a slightly higher degree of order that was obtained by this same basic process run with increased stirring rate and a more rapid warming of the reaction mixture.

Figure 6:
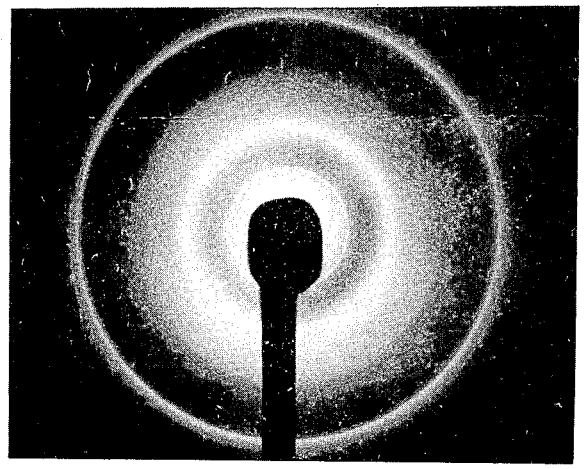

FIG. 4 shows a slightly higher degree of order yet that was obtained by the same basic process of adding solid terephthaloyl chloride to a DMAc solution, but on a much larger scale (Example XVI) than was used for the polymers described by FIGS. 5 and 6 above.

(B) Monomers added in polymer solvents (1) Polymer prepared by addition of a DMAc solution to TCl to DMAc solution of PABH.—A solution of 1.051 g. (0.00695 mole) of PABH in 11.8 ml. of DMAc was chilled to about −10° C. by the application of an ice-salt bath for 30 minutes. In an addition funnel, 1.411 g. (0.00695 mole) of TCl was dissolved as rapidly as possible in 10 ml. of DMAc and this solution added immediately at a moderate rate and with rapid stirring to the PABH solution. The funnel was rinsed with 1.9 ml. of DMAc. As the bath was allowed to warm gradually to room temperature the reaction mixture became very viscous. After 3½ hours, the polymer solution was diluted with an additional 4 ml. of DMAc; the inherent viscosity was 4.09.

Thin films were cast from those polymer solutions which, after washing, were strong and flexible.

(2) Polymer prepared by the addition of DMAc solution of p-aminobenzhydrazide to a solution of TCl in DMAc.—A solution of 1.057 g. (0.00695 mole) of PABH in 11.8 ml. of DMAc was added from a dropping funnel to a chilled solution of 1.411 g. (0.00695 mole) of TCl in DMAc. The PABH solution was added over a 5 minute period, with rapid stirring, immediately after the TCl had dissolved. After rinsing the funnel with 2 ml. of DMAc the bath was allowed to warm gradually to room temperature during which period the mixture became very viscous.

Other permutations and combinations as regards mixing of these reactants were tried. The results appear to be comparable.

(3) Polymer prepared by the addition of solid terephthaloyl chloride to a DMAc solution of p-aminobenzhydrazide into which an equimolar amount of anhydrous HCl had previously been added.—To a solution of 1.051 g. (0.00695 mole) of p-aminobenzhydrazide in 13.9 ml. of dry DMAc was added 9.76 ml. of a 0.712 N solution of HCl in DMAc (0.00695 mole) of HCl. This aminobenzhydrazide hydrochloride solution was then chilled to about −10° C. by the application of an ice-salt bath for 30 minutes. Terephthaloyl chloride, 1.411 g. (0.00695 mole), was then added as a solid with very rapid stirring. The reaction mixture was allowed to warm slowly to room temperature as the ice melted in the bath. The reaction mixture at first became opaque, but by the next morning it was clear, colorless, and very viscous; the inherent viscosity was 3.3.

The HCl also may be generated in situ, e.g., p-aminobenzoic acid may be reacted with terephthaloyl chloride in DMAc prior to addition of PABH and TCl; in an example, the amount of HCl produced was equivalent to the amount of PABH.

A further source of acid can be terephthalic acid; in an example, the amount of terephthalic acid was equivalent to PABH on a molar basis.

(4) Polymer prepared by the addition of a DMAc solution of terephthaloyl chloride to a DMAc solution of p-aminobenzhydrazide and triethylamine.—This polymer was prepared by a procedure similar to that described above in B (1), with the exception that 0.97 ml., 0.70 g. (0.0069 mole) of triethylamine was added to the aminobenzhydrazide solution just prior to the addition of the acid chloride.

(5) Polymer prepared by the addition of a DMAc-LiCl solution of terephthaloyl chloride to a DMAc-LiCl solution of p-aminobenzhydrazide.—This polymer was prepared by a procedure similar to that described above in B (1) with the exception that a 5% solution of LiCl in DMAc was substituted for pure DMAc in all steps.

(C) Further variations of modes of additions of monomers (1) Reaction of p-aminobenzhydrazide and solid terephthaloyl chloride by a one-step reaction in DMAc-LiCl.—This polymer was prepared as in Example III A, with the exception that a 5% solution of LiCl in DMAc was substituted for DMAc. FIG. 3 is an electron diffraction pattern of a polymer made by this lithium chloride modified process. A higher degree of order is seen than that of the polymers made by the solid TCl+DMAc solution process where LiCl was not employed (FIGS. 4, 5 and 6). It is also seen that the order of this "lithium chloride polymer" closely approaches that of the corresponding completely ordered polymer, FIG. 1.

(2) Preparation of polymer by the addition of solid PABH to a solution of TCl in DMAc.—DMAc (23.7 ml.) was charged to a reaction flask and chilled to about −10° C. Then 1.411 g. (0.00695 mole) of TCl was added with efficient stirring in order to dissolve the acid chloride as rapidly as possible. As soon as solution was complete, 1.051 g. (0.00695 mole) of solid PABH was added with rapid stirring. The side of the reaction flask was rinsed down with 1 ml. of DMAc. The stirred reaction mixture was allowed to warm gradually to room temperature, during which time it became very viscous; the inherent viscosity was 2.19.

(3) Preparation of polyamide-hydrazide in N-methylpyrrolidone.—This polymer was prepared in a manner similar to that described in Example III A, except that the solvent was N-methylpyrrolidone instead of DMAc.

(4) Preparation in HPT.—Example III A was repeated using as solvent hexamethyl phosphoric triamide (HPT).

(5) Polymerization by simultaneous addition of DMAc solutions of p-aminobenzhydrazide and terephthaloyl chloride to a Waring Blendor.—Into a Waring Blendor which had been well flushed with nitrogen was placed 90.3 ml. of chilled DMAc (withdrawn under nitrogen). Solutions of 2.102 g. (0.0139 mole) of p-aminobenzhydrazide in 15 ml. of chilled DMAc and 2.822 g. (0.0139 mole) of terephthaloyl chloride in 15 ml. of chilled DMAc were added simultaneously to the rapidly stirred solvent in the Blendor jar immediately after solution was effected. The reactant flasks were then rinsed immediately with 5 ml. of DMAc each. After five minutes of rapid mixing, the viscosity and temperature of the reaction mixture had increased. The stirring speed was then reduced significantly and the slower stirring was continued for fifteen minutes. At this point the reaction was considered essentially complete.

(D) Addition of diacid chloride monomer in an inert solvent (1) Preparation of polymer by the addition of a solution of TCl in chloroform to a DMAc-LiCl solution of PABH.—The reaction described in Example III B (1) was repeated with the exception that a solution of TCl chloroform was substituted for the DMAc solution of TCl. High molecular weight polymer was obtained which was cast into strong clear films.

(2) Preparation of polymer by the addition of TCl in THF to a solution of PABH and Et₃N in DMAc-LiCl.—A solution of 1.051 g. (0.00695 mole) of PABH in 23.7 ml. of 5% LiCl-DMAc was chilled to −10° C. A solution of 0.97 ml. (0.70 g.) (0.00695 mole) of Et₃N was added to the aminobenzhydrazide solution, followed immediately by a solution of 1.411 (0.00695 mole) of TCl in 25 ml. of THF which was added to at a moderate rate and with rapid stirring. The addition funnel was rinsed with 5 ml. of THF. A gummy yellow mass separated toward the end of the addition. Stirring was continued and the reaction mixture was allowed to warm slowly to room temperature under a rapid nitrogen sweep during which time the mixture became very viscous. After stirring overnight, the reaction mixture was diluted with 80 ml. of DMAc and neutralized with 0.514 g. (0.00695 mole) of Li₂CO₃.

(3) Polymer prepared by addition of TCl in THF to a solution of PABH in DMAc-LiCl.—A solution of 5.38 g. (0.0356 mole) PABH in 125 ml. DMAc containing 5% dissolved LiCl was cooled to −10° C. and a solution of 7.23 g. (0.036 mole) terephthaloyl chloride in 160 ml. THF was added dropwise over a period of 45 minutes (about ⅔ of the solution was added during 35 minutes at the end of which time the solution was clear). As the remaining ⅓ solution was added, the dope became cloudy.

After addition of the THF-TCl solution, the dope was stirred for 10 minutes then allowed to warm to room temperature under vacuum over a period of about 90 minutes. Most of the THF was thus removed.

Prior to spinning, the very viscous solution was diluted by the addition of 80 ml. of solvent and neutralized by lithium carbonate (with heating). The inherent viscosity of the dried bulk polymer was 4.76 (determined at 30° C. for 0.5 g./100 ml. of dimethylsulfoxide).

Fibers from the above described polymer had the following tensile properties (T/E/M$_i$):

(1) low stretch—4.5/43.0/83 (den., 6.5)
(2) med. stretch—5.8/10.9/180 (den., 4.4)
(3) high stretch—4.5/28.5/136 (den., 4.8)
(4) hot-drawn—9.9/3.5/390 (den., 3.2)

Film of polymer made similarly by the addition of a solution of TCl in THF to a DMAc-LiCl solution of PABH has a degree of order essentially the same but not exactly the same as that of the completely ordered polymer as shown by electron diffraction, FIGS. 2 and 1 respectively.

(4) Preparation of polymer by the addition of TCl in THF to a solution of PABH and Et$_3$N in DMAc.—The reaction described above in Example D (2) was repeated with the exception that DMAc, rather than DMAc-LiCl, was used as the solvent.

EXAMPLE IV

A polyamide-hydrazide from m-aminobenzhydrazide (MABH) and terephthaloyl chloride was prepared by a one-step reaction in solution.

To a solution of 10.57 g. (0.07 mole) of m-aminobenzhydrazide in 95 ml. dimethylacetamide containing 5% dissolved LiCl was added at −20° C. 14.21 g. (0.07 mole) of terephthaloyl chloride. The solution was stirred at −20° C. for 5 minutes and then allowed to warm to room temperature and stirred for two hours. The mixture was then neutralized with 3.36 g. lithium hydroxide slurried in 20 ml. DMAc. The clear viscous solution was spun to a 4.3 denier fiber of excellent luster. Fiber properties are given in Table II.

Upon heat-aging the above fiber in air at 300° C., the fiber was shown to retain its properties well (see Table III).

EXAMPLE V

The polyamide-hydrazide from p-aminobenzhydrazide and isophthaloyl chloride was prepared by a process similar to that of Example IV. Fiber tensile properties are given in Table II.

It is possible to prepare polyamide-hydrazides from two diacid chloride monomers reacted with a single aminoaroylhydrazide monomer. The polymer properties are dependent upon the order of addition; i.e., if one-half mole of terephthaloyl chloride is added to one mole of PABH followed by one-half mole of isophthaloyl chloride, the polymer is different from that obtained by the reverse order of addition. When the two acid chlorides are mixed together and added to PABH, the properties of the resultant polymer are intermediate between the two polymers described above.

EXAMPLE VI

Tensile properties of the fiber from the polymer obtained as in Example IV but by addition of one-half of the MABH equivalent amount terephthaloyl chloride followed by the remaining half of the MABH equivalent amount of isophthaloyl chloride are described in Table II.

EXAMPLE VII

Example VI was repeated except that the isophthaloyl chloride was added prior to the addition of terephthaloyl chloride.

EXAMPLE VIII

Example VI was repeated except that both the terephthaloyl and isophthaloyl chloride were added simultaneously. The tensile properties of the fiber were found to be intermediate between those of VI and VII in tenacity, elongation and initial modulus (see Table II).

EXAMPLE IX

Alternatively, it is possible to use the molten acid chloride instead of the solid acid chloride. Thus, PABH in DMAc solution was reacted with molten TCl. The resulting polymer was cast to good film.

EXAMPLE X

Further, in addition to the dicarbonyl chlorides of benzene, it is possible to use more complex diacid chlorides, e.g., 4,4′-biphenylenedicarbonyl chloride and 2,6-naphthalenedicarbonyl chloride. PABH in DMAc solution reacted with either of these acid chlorides gave viscous solutions from which good films were cast.

EXAMPLE XI

Although a preferred preparation of polyamide-hydrazides involves solution polycondensation, it is also possible to prepare these polymers via interfacial polymerization.

A solution of 1.51 g. (0.01 mole) of p-aminobenzhydrazide was dissolved in 150 ml. of boiling water. The solution was cooled to room temperature and was placed in a Blendor jar with 50 g. of ice, 0.1 g. of Duponol ME, 2.2 g. sodium carbonate and 10 ml. tetrahydrofuran. The slurry was stirred rapidly and a solution of 2.03 g. (0.01 mole) terephthaloyl chloride in 30 ml. of tetrahydrofuran was added. The reaction was stirred rapidly for 15 minutes.

The precipitated polymer was separated on a filter and washed with water several times before drying.

Solutions were prepared in dimethyl sulfoxide (DMSO) and films were cast from this solution.

Other useful acid acceptors may be used. For example, when magnesium oxide (MgO) was used in the above example a polymer having an inherent viscosity of 0.9 (in DMSO) was obtained. Electron diffraction showed this to be a very highly ordered polymer.

EXAMPLE XII

It is also possible to make polymers with a relatively large amount of para-oriented rings and a relatively small amount of meta-oriented rings (and vice versa). For example, in Example III A, the reaction of PABH and TCl may be modified so that 5–20% of isophthaloyl chloride may be substituted for TCl. The gross effects on the polymer are not readily apparent except when the tensile properties of the derived fibers are examined. Thus, while tenacity and modulus are little affected, the elongation (and especially its retention on heat aging) is increased, yielding a less brittle fiber. In the case of a polymer prepared according to the procedure described in III A in which 10% of the phenylene units were meta and 90% were para (achieved by use of some isophthaloyl chloride) the electron diffraction pattern showed less order than that seen in FIG. 6. Likewise MABH may be substituted for PABH. Alternatively, small substitutions in both the aminoaroylhydrazide and diacid chloride monomers may be made to achieve the desired overall level of properties by virtue of the amount and placement of the various arylene units of differing orientation.

For certain reasons such as ease of fabrication a predominantly meta-oriented structured polyamide-hydrazide is sometimes needed. In such cases the desired degree of "stiffness" can be imparted by substitution of para units for meta ones.

EXAMPLE XIII

It was possible to polymerize the dihydrazide-diamines of Table I with varying amounts of the aminoaroylhydrazide monomers, when one uses a stoichiometric amount of aromatic diacyl chloride with respect to both the aminoaroylhydrazide and diamine. High molecular weight polymers were achieved from which excellent films were cast. In a typical example one mole of dihydrazide-diamine A and two moles of p-aminobenzhydrazide in DMAc–5% LiCl were reacted with three moles of TCl. Excellent films were obtained from such polymer.

EXAMPLE XIV

While the foregoing examples illustrate the polymerization of the diamines of Table I, and m- and p-aminobenzhydrazides, it is also possible to make polyamide-hydrazides with o-aminobenzhydrazide. When the latter was polymerized with TCl, the inherent viscosities of the polymers of this type were found to be relatively low, reflecting possibly a lower degree of purity for the monomer or possibly different solution properties for these polyamide-hydrazides. Despite the low inherent viscosities, films could be made.

Small substitutions of o-aminobenzhydrazide in polymerizations of PABH in TCl, however, yield high molecular weight polymers.

EXAMPLE XV

Isolated and thoroughly dried polymer prepared as in Example III A was dissolved in dimethylsulfoxide and spun to fiber of excellent quality.

EXAMPLE XVI

Large scale preparation of polyamide-hydrazide from p-aminobenzhydrazide and terephthaloyl chloride A solution of 2741.4 g. (18.75 moles) of p-aminobenzhydrazide in 66.725 liters (139 lbs.) of dry dimethylacetamide was charged to a 30-gallon Pfaudler reactor and the solution cooled to —5° C. Next, 3654.59 (18.0 moles) of solid terephthaloyl chloride was added with rapid stirring. Stirring was continued at a rapid rate for 45 minutes after completion of the addition of the terephthaloyl chloride, while circulating a coolant through the reactor jacket. The coolant circulation was then stopped. Stirring was continued at ambient temperature for one hour, with the rate being slowed as the dope viscosity built up. A slurry of 3171.2 g. (18.0 moles) of calcium acetate monohydrate, 653.4 g. of deionized water and 16,501 ml. (33.2 lbs.) of dimethylacetamide was prepared and added to the polymerization mixture. After adding the slurry, the polymer solution was stirred at ambient temperature for one hour and then heated to 70–75° C. by circulating a heat exchange medium at 85–95° C. through the reactor jacket (about 2.5 to 3 hours will usually be required to reach this temperature). When the temperature reached 70–75° C., vacuum degassing of the polymer solution was started. After about 15 minutes the degassing was completed by the application of full vacuum for 5 minutes without stirring. The reactor was pressured with nitrogen and the polymer solution extruded under nitrogen pressure. The polymer solution of 6.16% solid content had an inherent viscosity of 6.14.

EXAMPLE XVII

To a solution of 8.64 g. (0.02 mole) of dihydrazide-diamine A in 70 ml. of 5% lithium chloride/dimethylacetamide at —10° C., was added 4.06 g. (0.02 mole) of solid isophthaloyl chloride. After 20 minutes at —10° C., the polymer solution was clear and very viscous. The solution was allowed to warm to room temperature. After 3 hours, the polymer solution was neutralized by the addition of 1.4 g. of $Li_2CO_3$, degassed and spun into fibers.

TABLE II.—TENSILE PROPERTIES OF SELECTED POLYAMIDE-HYDRAZIDE FIBERS

| Fiber of example No. | T/E/M$_i$ (work) den. | |
|---|---|---|
| | High elongation fiber | Low elongation fiber |
| III C (1) | 6.6/28.0/149 (1.0)3.9 | 12.5/4.3/— (0.35)2.79 |
| VI | 2.8/67.6/66 (1.450)5.60 | 10.5/4.8/323 (0.294)1.85 |
| VIII | —————— | 8.7/4.4/321 (0.248)8.8 |
| VII | 2.7/58.8/70 (1.270)7.30 | 6.7/3.3/289 (0.149)2.80 |
| V | 1.5/82.9/47 (1.051)8.17 | 6.0/9.6/114 (0.353)2.82 |
| IV | 1.3/95.8(28 (—)14.4 | 5.4/18.6/85 (0.676)4.23 |

TABLE III.—RETENTION OF TENSILE PROPERTIES AT ELEVATED TEMPERATURES FOR POLYAMIDE-HYDRAZIDE FIBERS

| | T/E/M$_i$ | | |
|---|---|---|---|
| | Fiber of example No.: III C (1) | | |
| Temp., °C. | High elongation | Low elongation | IV |
| 21 | 6.6/28.0/149 | 12.5/4.3 | 5.4/18.6/85 |
| 50 | 6.1/30.3/122 | 10.9/3.6 | 4.5/16.6/63 |
| 100 | 5.1/33.1/106 | 9.1/3.0 | 4.6/17.3/63 |
| 150 | 4.5/36.8/84 | 8.5/3.2 | 4.2/21.1/54 |
| 200 | 4.3/35.6/75 | 6.0/3.5 | 3.3/19.8/50 |
| 250 | 2.7/56.6/52 | 3.9/10.2 | 2.5/22.9/41 |
| 300 | 1.6/14.6/62 | 3.6/2.3 | 1.2/14.8/14 |
| 350 | —————— | 0.5/0.6 | 0.2/3/— |

TABLE IV.—TENSILE PROPERTIES AFTER HEAT-AGING IN AIR AT 30° C. FOR POLYAMIDE-HYDRAZIDE FIBERS

| | T/E/M$_i$ den. | | |
|---|---|---|---|
| | Fiber from polymers of example No.: III C (1) | | |
| Time, hrs. | High elongation | Low elongation | IV |
| 0 | 6.62/28.3/— (4.18) | 12.5/4.3 (2.79) | 3.04/20.4/56 (7.97) |
| 4 | 6.39/2.6/— (3.63) | —————— | 1.19/6.33 (8.8) |
| 8 | 3.32/1.4/— (3.78) | —————— | 1.05/11.04 (11.4) |
| 24 | 3.51/1.7/— (3.6) | —————— | 1.16/12.1 (10.13) |
| 96 | 1.34/0.82/— (3.93) | ᵃ3.3/1.5/253 | 1.32/14.5 (10.8) |
| 120 | 1.47/1.4/— (4.61) | ᵇ2.3/1.6/212 | 1.32/11.9 (9.1) |

ᵃ 72 hrs. highest single break: 4.1/2.0/258.
ᵇ 136 hrs. highest single break: 4.6/2.5/226.

TABLE V.—TENSILE PROPERTIES AFTER HEAT-AGING IN AIR AT 185° C. FOR SELECTED FIBERS

| | T/E/M$_i$ den. | | |
|---|---|---|---|
| | Example of fiber from polymer of example No.: III C (1) | | |
| Time, hrs. | High elongation | Low elongation | IV |
| 0 | 6.2/20.0/188 4.06 | 10.0/3.0 2.95 | 5.4/18.6/85 4.23 |
| 4 | 6.4/20.8/174 4.11 | 10.8/3.6/401 3.12 | 5.1/17.9/78 4.20 |
| 8 | 6.2/17.8/168 4.14 | 11.0/3.4 2.68 | 4.7/15.9/76 4.17 |
| 24 | 6.3/19.4/162 4.06 | 11.2/3.9/397 2.93 | 5.2/19.4/76 4.21 |
| 48 | 6.0/14.2/173 4.02 | 10.7/3.4/344 3.02 | 4.9/18.2/77 4.20 |

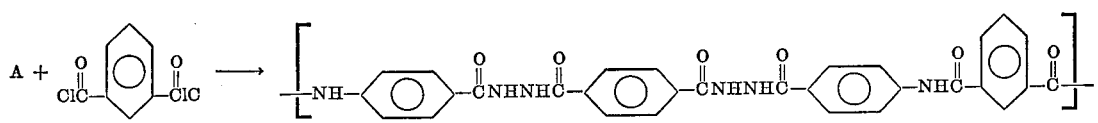

TABLE VI.—CHEMICAL RESISTANCE OF POLYAMIDE-HYDRAZIDE FIBERS

| Chemical | Conc., percent | Temp., °C. | Time, hrs. | T/E/Mi, fibers from polymers of example No.: | |
| --- | --- | --- | --- | --- | --- |
| | | | | III C (1) | IV |
| None | | 21 | | 12.5/4.3 | 5.4/18.6/85 |
| Acids: | | | | | |
| Sulfuric | 10 | 21 | 168 | 10.8/3.6 | 3.5/15.6/76 |
| Do | 10 | 95 | 5 | 2.8/0.9 | 1.8/5.4/65 |
| Bases: | | | | | |
| Sodium hydroxide | 10 | 21 | 168 | a Failed | a Failed |
| Do | 10 | 60 | 5 | 2.1/3.0/187 | b Failed |
| Ammonium hydroxide | 38 | 21 | 168 | 7.9/3.8/380 | 3.9/93.9/53 |
| Miscellaneous: | | | | | |
| Water | 100 | 100 | 24 | 12.3/3.5/405 | 4.5/22.5/63 |
| Dimethylacetamide | 100 | 21 | 168 | 1.3/2.9/66 | b Failed | a Dissolved when washed with water at conclusion of test.
b Too brittle to test.

EXAMPLE XVIII

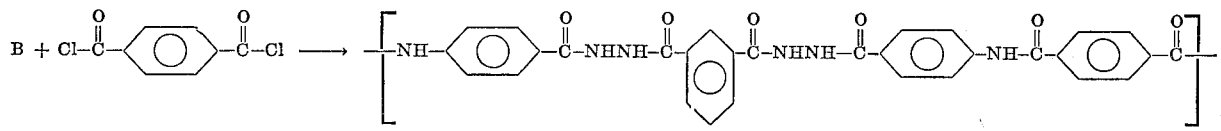

To a solution of 0.216 g. (0.0005 mole) dihydrazide-diamine B in 3 ml. of N-methylpyrrolidone (NMP) at 0° C. was added 0.102 g. (0.0005 mole) TCl with stirring. The colorless solution was cast to good film; the inherent viscosity of the bulk polymer in NMP at 30° C. was 0.97.

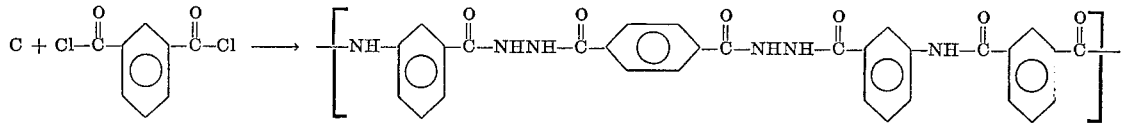

This example was repeated using isophthaloyl chloride. Good film was obtained; the inherent viscosity of the polymer in NMP at 30° C. was 0.53.

EXAMPLE XIX

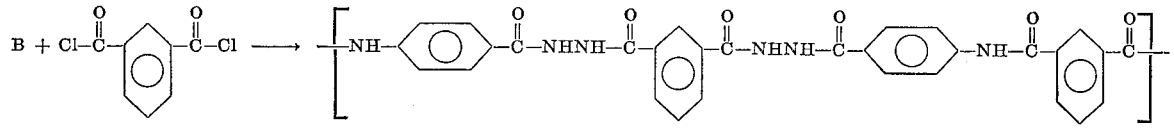

Example XVIII above was repeated using dihydrazide-diamine C and terephtholoyl chloride. Good film was obtained from solution. The inherent viscosity of the polymer was 1.08 in NMP at 30° C.

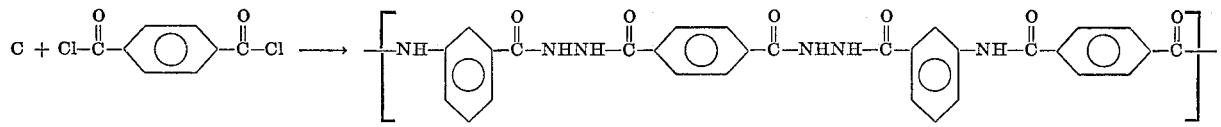

This example was repeated using isophthaloyl chloride; the inherent viscosity of the bulk polymer was 0.48 at 30° C. in a 50:50 mixture of NMP and DMAc containing 5 percent dissolved lithium chloride.

EXAMPLE XX

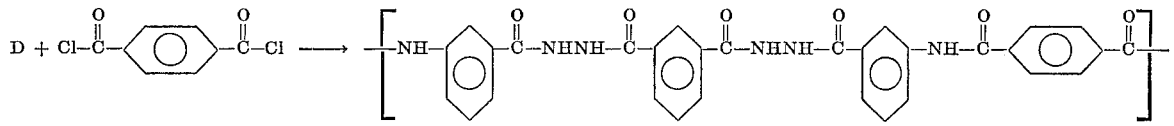

The procedure of Example XVIII was repeated using dihydrazide-diamine D and terephthaloyl chloride: DMAc containing 5 percent dissolved lithium chloride was used as solvent. The inherent viscosity of the polymer in DMAc at 30° C. was 0.63.

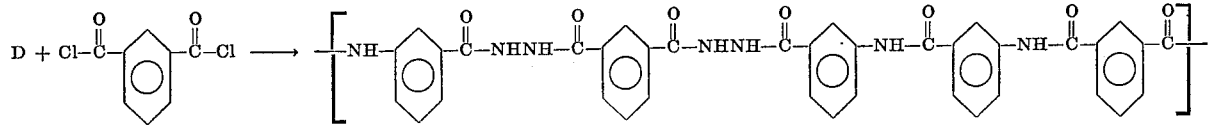

This example was repeated using isophthaloyl chloride. The inherent viscosity of the polymer in DMAc at 30° C. was 0.38.

EXAMPLE XXI

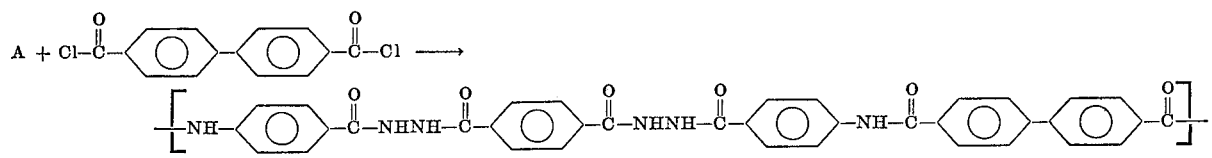

The procedure of Example XVIII was repeated using dihydrazidediamine A and 4,4'-biphenylenedicarbonyl chloride; NMP containing 5 percent dissolved lithium chloride was used as solvent. The solution of polymer was virtually colorless and clear. Films were obtained from solution.

EXAMPLE XXII

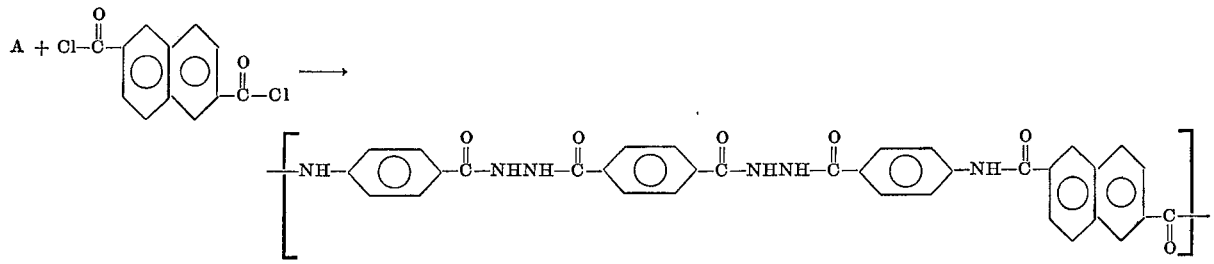

The procedure of Example XXI was repeated except that 2,6-naphthalenedicarbonyl chloride was used. The colorless, clear and very viscous solution of polymer was cast to excellent films.

EXAMPLE XXIII

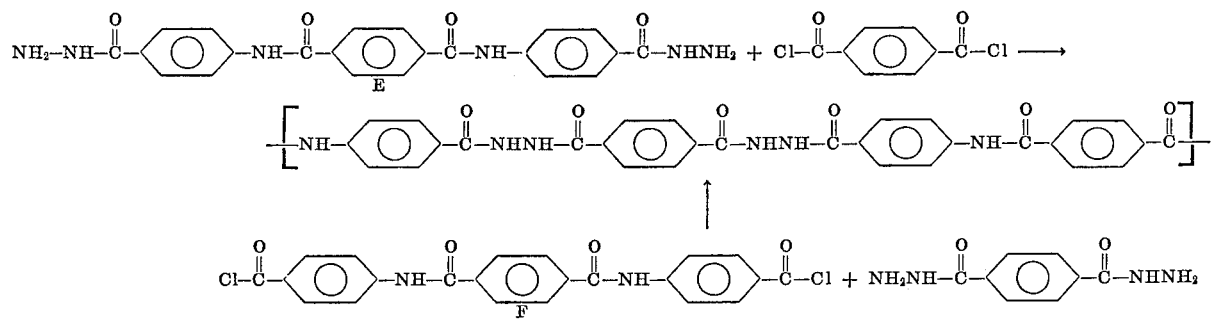

This example illustrates an alternate method for the preparation of the previously described polyamide-hydrazides of the type produced by the two-step method. E may be prepared by reacting excess hydrazine with the product from the reaction of terephthaloyl chloride and methyl p-aminobenzoate. E is readily polymerized with TCl in HPT at low temperatures.

Alternatively, F may be polymerized with terephthaloyl dihydrazide in HPT at low temperatures. F may be prepared by the reaction of thionyl chloride on the product obtained from p-aminobenzoic acid and TCl.

Polyamide-hydrazides of the type obtained from the previously described one-step process may also be prepared from monomers other than simple dicarbonyl monomers reacted with simple aminobenzhydrazide monomers by other methods.

The foregoing detailed description has been given for clearness of understanding only, and unnecessary limitations are not to be construed therefrom. The invention is not to be limited to the exact details shown and described since obvious modifications will occur to those skilled in the art, and any departure from the description herein that conforms to the present invention is intended to be included within the scope of the claims.

I claim:
1. A process for the preparation of a film and fiber forming, wholly aromatic polyamide-hydrazide having a regularly recurring structural unit of the formula:

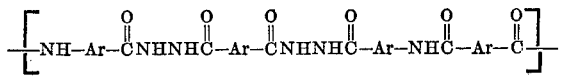

wherein Ar is an aromatic radical selected from the group consisting of

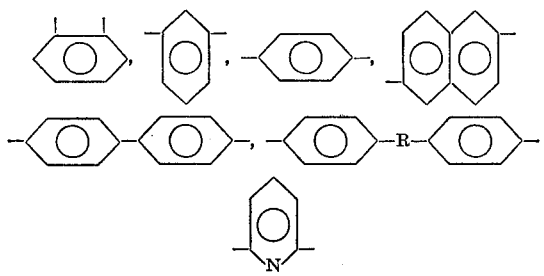

wherein R represents a linkage selected from the group consisting of

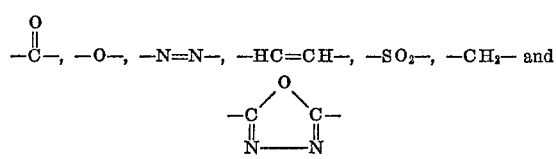

said process comprising the steps of:
(1) bringing together in the presence of an amide type solvent substantially equimolar proportions of an aromatic diacid halide and a dihydrazide-diamine of the formula:

$$NH_2-Ar-\overset{O}{\underset{\|}{C}}-NHNH-\overset{O}{\underset{\|}{C}}-Ar-\overset{O}{\underset{\|}{C}}-NHNH-\overset{O}{\underset{\|}{C}}-Ar-NH_2$$

wherein Ar is as difined above, (2) and conducting a reaction under polycondensation conditions at a temperature below about 100° C.

2. The process of claim 1 wherein the aromatic diacid halide is employed in solid form, and the reaction is conducted at a temperature of from about −30° C. to 35° C. with stirring.

3. The process of claim 1 wherein the solvent medium is dimethylacetamide containing dissolved lithium chloride.

4. The process of claim 1 wherein the solvent medium includes an acid acceptor.

5. The process of claim 4 wherein the acid acceptor is a tertiary amine.

References Cited

UNITED STATES PATENTS

| 2,765,304 | 10/1956 | Siegrist et al. | 260—558 X |
| 3,130,182 | 4/1964 | Frazer | 260—78 |
| 3,389,122 | 6/1968 | Culbertson | 260—47 |
| 3,410,834 | 11/1968 | Pruckmayr | 260—78.4 |

OTHER REFERENCES

Journal of Polymer Science, Part B, vol. 50, September 1967, pp. 807–812, Culbertson.

HOWARD E. SCHAIN, Primary Examiner

U.S. Cl. X.R.

260—30.2, 30.6 R, 30.8 DS, 47 CP, 63 N, 65.78 TF.